UNITED STATES PATENT OFFICE.

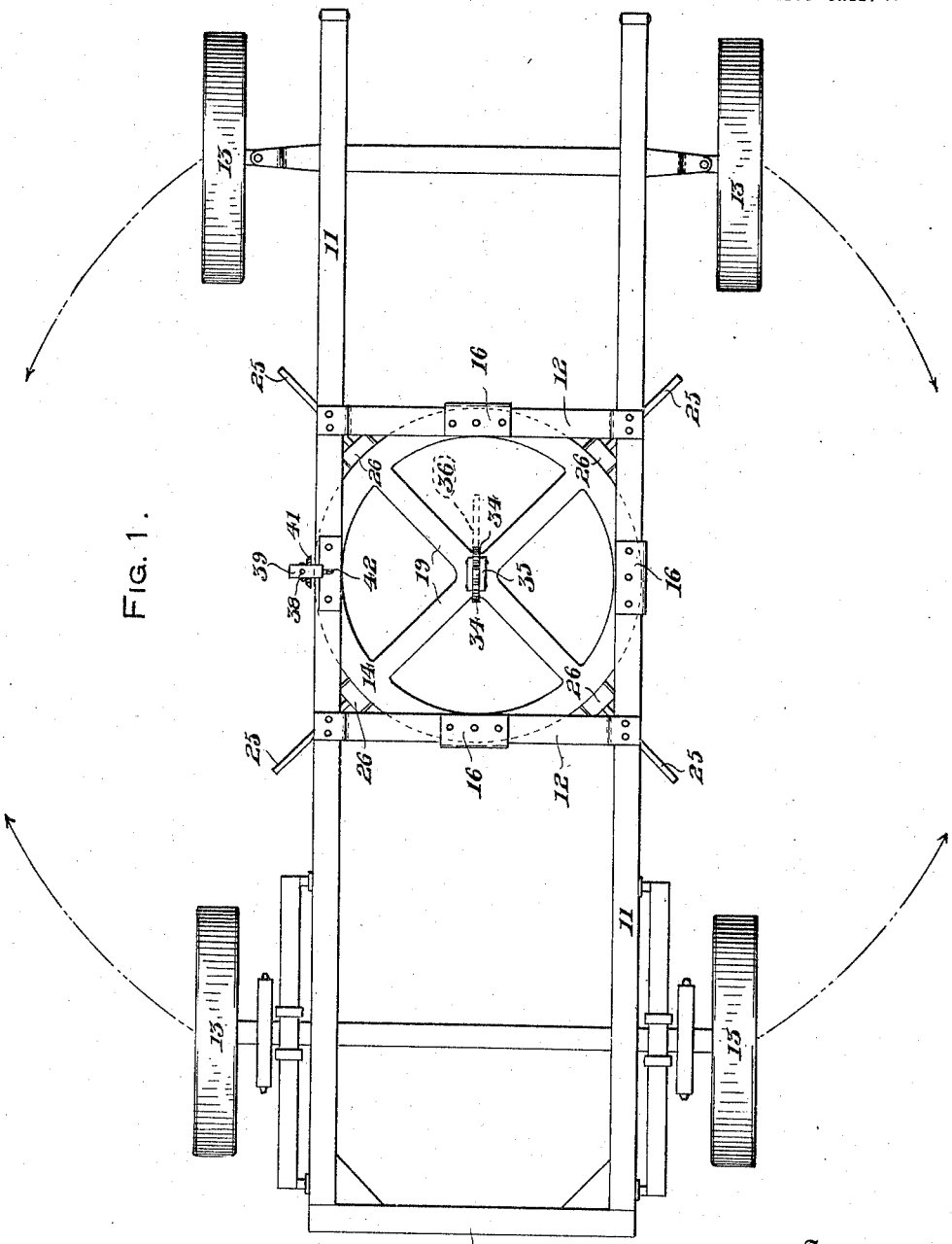

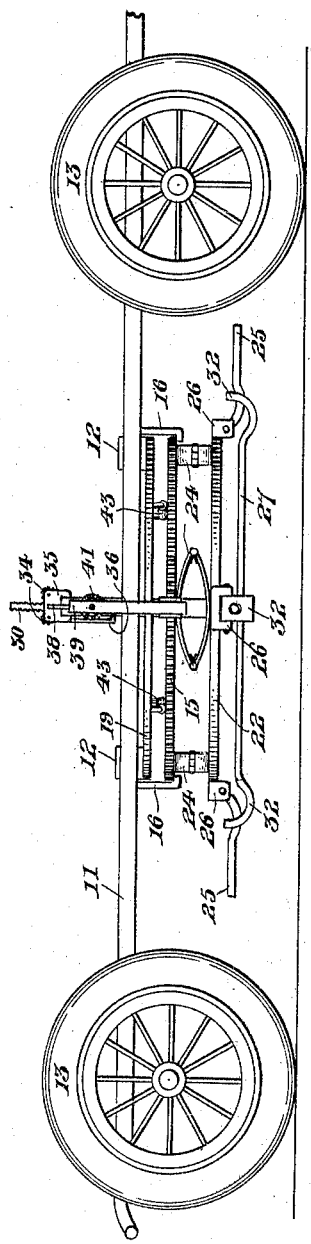

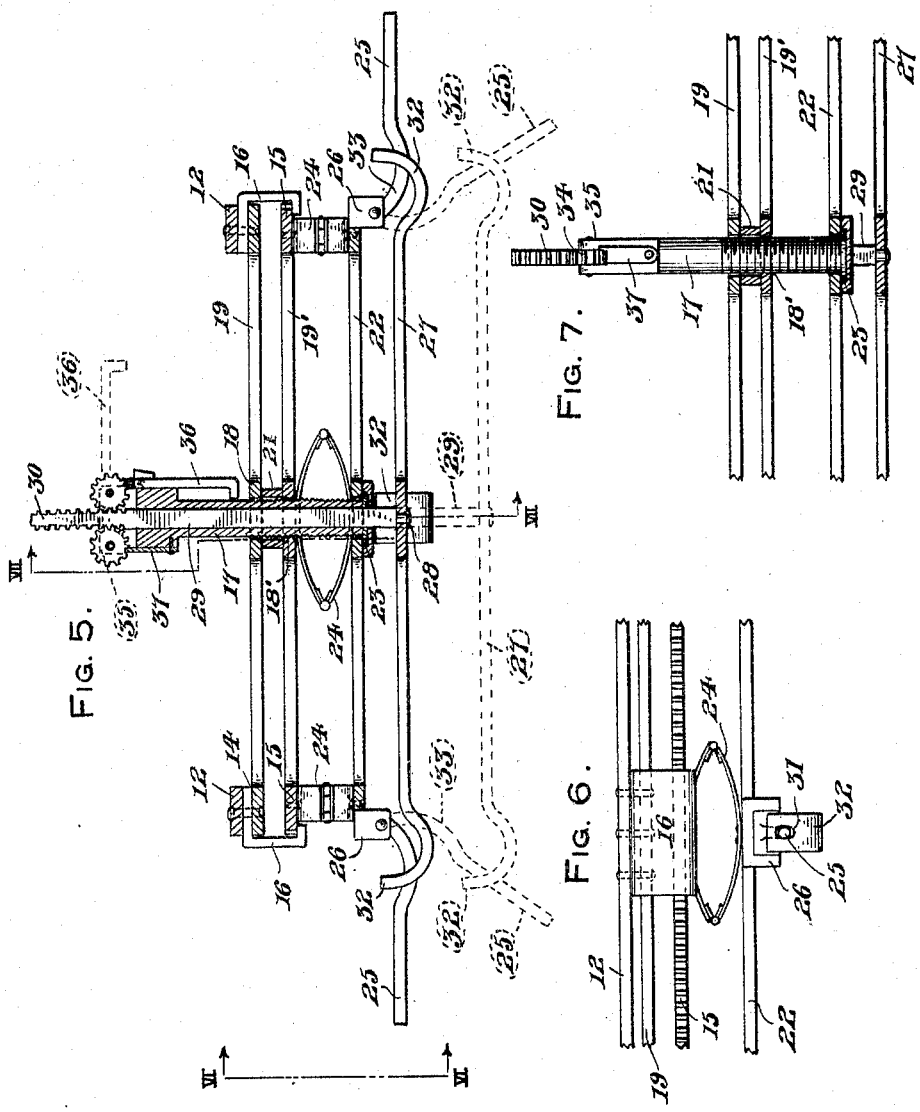

JAN GRYCZESKI, OF BAYONNE, NEW JERSEY.

TURN-TABLE DEVICE FOR AUTOMOBILES.

1,303,554.   Specification of Letters Patent.   Patented May 13, 1919.

Application filed February 12, 1919. Serial No. 276,687.

*To all whom it may concern:*

Be it known that I, JAN GRYCZESKI, a citizen of Russia, residing at Bayonne, in the county of Hudson and State of New Jersey, have invented certain new and useful Improvements in Turn-Table Devices for Automobiles, of which the following is a specification.

The primary object of the invention is the provision of a ready means carried by an automobile or similar vehicle whereby the same may be readily elevated and turned for traveling in a different direction, in such instances, as where the vehicle is positioned in a ditch or at a place where it is impossible for the vehicle to turn around by traveling in an arcuate path in the usual manner.

A further object of the invention is to provide an attachment for a vehicle that is normally positioned out of the way so as not to interfere with the usual running of the vehicle but which is ready for immediate use in elevating the vehicle above the roadway whenever desired after the manner of a lifting jack, the same being provided with operating means for revolving the vehicle when in its elevated position.

My invention possesses great strength and is compact in arrangement and will now be fully described in connection with the accompanying drawings in which like reference characters designate corresponding parts throughout the several views.

In the drawings,

Figure 1 is a top plan view of a chassis provided with my invention.

Fig. 2 is a side elevation thereof.

Fig. 3 is an end view of the same,

Fig. 4 is a view similar to Fig. 3 showing the vehicle in its elevated position, parts being omitted, Fig. 5 is an enlarged radial sectional view taken through the invention, parts being indicated by dotted lines in their operative positions.

Fig. 6 is a fragmentary elevational view looking in the direction of the arrows VI—VI of Fig. 5, and Fig. 7 is a sectional view taken upon line VII—VII of Fig. 5.

Referring more in detail to the drawings, my invention is herein illustrated operatively mounted upon the chassis frame 10 of a vehicle provided with the usual side bars 11 and spaced cross braces 12, ground wheels 13 being provided beneath the frame.

A ring 14 is secured beneath the frame 10 substantially centrally thereof to the side bars 11 and transverse braces 12. A rack or gear 15 of the same diameter as the ring 14 is mounted beneath said ring, U-shaped clips 16 carried by the ring 14 project inwardly beneath the gear 15.

A tubular shaft 17 is vertically positioned journaled through the central perforation 18 of a spider 19 provided in the ring 14, while a spacing collar 21 is positioned between the spiders 19 and 19′ of the ring and gear respectively.

The gear 15 is centrally swiveled as at 23 to the lower end of the shaft 17 while elliptical springs 24 are connected between the marginal portions of the gear 15 and wheel 22. The shaft 17 is threaded through the central perforation 18′ of the gear spider 19′. From the foregoing description, it will be apparent that the gear 15 and ring 14 may be elevated and lowered relatively of the wheel 22 upon turning the shaft 17 in the required direction.

Legs 25 in the form of bars are pivotally connected to the wheel 22 by means of brackets 26, four diametrically positioned legs 25 being preferably employed. An X-shaped shifter 27 beneath the wheel 22 is journaled as at 28 upon the lower end of a squared rack 29 slidably positioned axially through the shaft 17 and having a toothed upper portion 30 projecting above the upper end of said shaft. The legs 25 freely project through perforations 31 in the curved free ends 32 of the shifter 27 and whereby the legs 25 will be maintained elevated when the shifter 27 is at the upward limit of its movement substantially in contact with the lower end of the shaft 17. Upon forcibly depressing the rack 29, the shifter 27 will be lowered, forcing the legs 25 to their lower positions beneath the frame 10 as indicated in Fig. 4 of the drawings. The upper end portions 33 of the legs 25 are also curved at the point where the legs extend through the perforations 31 when the shifter 17 is in its normal elevated position.

Pinions 34 are mounted upon the top of the shaft 17 by means of a bracket 35, the said pinions being in constant mesh with the opposite sides of the rack portion 30 and operable by a swinging ratchet lever 36. When the device is in its normal position as shown in Figs. 2 and 5 of the drawings, with the leg 25 elevated, the lever 36 may be operated for turning the pinions 34 and feeding the rack 29 downwardly through the shaft 17 for positioning the legs 25 in braced supporting position beneath the wheel 22. When the shifter 27 is in its lowered position, a latch 37 may be swung upwardly into engagement with one of the pinions 34 for locking the rack and pinions against movement with the legs 25 lowered. The ratchet lever 36 may then be positioned horizontally as indicated by dotted lines in Fig. 5 of the drawings and employed for forcibly revolving the shaft 17 upon its swivel connection 33, thereby screwing the gear 15 upwardly by reason of the screw threaded connection 18' between the shaft 17 and gear 15. The ring 14 is carried upwardly with the gear 15 and the frame 10 being mounted upon the ring 14, it will be seen that the automobile frame will also be elevated bringing the wheels 13 above the ground or roadway. The springs 24 open during the separation of the wheels 22 and gear 15.

Means are provided for revolving the ring 14 after the manner of a turn-table and consists of an upright shaft 38 journaled in a bracket 39 carried by one of the side bars 11, a pinion 40 upon the shaft 28 being in constant mesh with the gear 15 while pinion driving means 41 carried by the bracket 39 is adapted to revolve the shaft 38. A crank, not shown, may be applied to the squared end of the axle 42 for turning the pinion connection 41 and it will be seen that by turning the shaft 38 when the gear 15 is elevated, that the ring 14 and frame 10 will be revolved upon the gear 15, supporting rollers 43 being provided upon the ring 14 and running upon the upper face of the gear 15. When the automobile has been rotated to the desired position, the shaft 17 may be revolved for lowering the frame 10 as well as the gear 15 and ring 14 to its normal position with the wheels 13 upon the roadbed. The latch 37 may then be released and the lever 36 employed for elevating the rack 29 and shifter 27 to position the legs 25 in their normal elevated position free from the roadbed for permitting the travel of the vehicle upon its wheels 13.

A strong and convenient means is provided readily carried at all times by a vehicle for use as an elevating jack as well as a turn-table for the vehicle.

What I claim as new is:—

1. A device of the class described comprising in combination with a vehicle chassis, a ring secured thereto, a gear upon which said ring is shiftably mounted, a wheel resiliently attached beneath said gear, supporting means for said wheel, means for elevating the gear and chassis above said wheel and means for rotating the ring upon the gear when the chassis is elevated.

2. In combination with a vehicle frame, a gear positioned therebeneath, anti-friction bearings between the frame and gear, an adjustable support carried beneath the gear adapted for engaging the roadbed, means adapted for elevating the gear and frame above said support and means for revolving the frame upon the gear.

3. A device of the class described comprising a wheel, adjustable supporting legs carried by the wheel, a gear adapted for vertical movement above said wheel, a vehicle frame journaled upon the top of said gear, means adapted for moving said gear relatively of the wheel and elevating and lowering means for said legs.

4. A device of the class described comprising a vehicle frame, a ring carried beneath the frame, a gear journaled beneath said ring, a wheel mounted beneath the gear, a shaft swivelly connected to said wheel and having threaded connection with said gear whereby the gear, ring and frame may be elevated and lowered relatively of said wheel, and adjustable ground engaging means beneath the wheel.

5. A device of the class described comprising a vehicle frame, a ring carried beneath the frame, a gear journaled beneath said ring, a wheel mounted beneath the gear, a shaft swivelly connected to said wheel and having threaded connection with said gear whereby the gear, ring and frame may be elevated and lowered relatively of said wheel, operative connections between said ring and gear adapted for revolving the ring and frame relatively of the gear, and ground engaging legs pivotally connected to the said wheel.

6. A device of the class described comprising a vehicle frame, a ring carried beneath the frame a gear journaled beneath said ring, a wheel mounted beneath the gear, a shaft swivelly connected to said wheel and having threaded connection with said gear whereby the gear, ring and frame may be elevated and lowered relatively of said wheel, operative connections between said ring and gear adapted for revolving the ring and frame relatively of the gear, ground engaging legs pivotally connected to said wheel, an X-shaped shifter beneath the wheel operatively connected to the said legs whereby the legs are normally elevated above the ground when the shifter is in its elevated position, an operating rack swivelly connected to said shifter and operating means for the rack adjacent the upper end of said shaft.

7. In combination with a vehicle frame, a ring secured substantially centrally beneath the frame, a gear of substantially the same diameter as the ring positioned beneath the latter, guide clips carried by the ring extending beneath the periphery of the gear, supporting rollers carried beneath the ring mounted for travel upon the gear, a wheel adapted for movement toward and away from said gear positioned beneath the latter, resilient connections between said wheel and gear, a shaft centrally threaded through said gear and centrally swiveled to said wheel and freely extending centrally through the ring, the said shaft being adapted for rotation whereby the wheel and gear are relatively shifted at will and ground engaging means beneath the wheel.

8. In combination with a vehicle frame, a ring secured substantially centrally beneath the frame, a gear of substantially the same diameter as the ring positioned beneath the latter, guide clips carried by the ring extending beneath the periphery of the gear, supporting rollers carried beneath the ring mounted for travel upon the gear, a wheel adapted for movement toward and away from said gear positioned beneath the latter, resilient connections between said wheel and gear, a shaft centrally threaded through said gear and centrally swiveled to said wheel and freely extending centrally through the ring, the said shaft being adapted for rotation whereby the wheel and gear are relatively shifted at will, ground engaging means beneath the wheel, a pinion in constant mesh with said gear, operating means for said pinion carried by the vehicle frame whereby said frame and ring are adapted for rotation relatively of the gear and adjustable ground engaging supports carried beneath said wheel.

9. In combination with a vehicle frame, a ring secured substantially centrally beneath the frame, a gear of substantially the same diameter as the ring positioned beneath the latter, guide clips carried by the ring extending beneath the periphery of the gear, supporting rollers carried beneath the ring mounted for travel upon the gear, a wheel adapted for movement toward and away from said gear positioned beneath the latter, resilient connections between said wheel and gear, a shaft centrally threaded through said gear and centrally swiveled to said wheel and freely extending centrally through the ring, the said shaft being adapted for rotation whereby the wheel and gear are relatively shifted at will, ground engaging means beneath the wheel, a pinion in constant mesh with said gear, operating means for said pinion carried by the vehicle frame whereby said frame and ring are adapted for rotation relatively of the gear, supporting legs pivotally attached to said wheel, an operating shifter for said legs beneath said wheel, an operating rack swivelly connected to said shifter axially extending through the shaft and sliding means for the rack mounted adjacent the upper end of said shaft.

In testimony whereof I affix my signature.

JAN GRYCZESKI.

Copies of this patent may be obtained for five cents each, by addressing the "Commissioner of Patents, Washington, D. C."